(12) United States Patent
Francke

(10) Patent No.: US 6,784,436 B2
(45) Date of Patent: Aug. 31, 2004

(54) RADIATION DETECTOR ARRANGEMENT

(75) Inventor: Tom Francke, Sollentuna (SE)

(73) Assignee: Xcounter AB, Danderyd (SE)

( * ) Notice: Subject to any disclaimer, the term of this patent is extended or adjusted under 35 U.S.C. 154(b) by 154 days.

(21) Appl. No.: 10/124,305

(22) Filed: Apr. 18, 2002

(65) Prior Publication Data

US 2003/0155518 A1 Aug. 21, 2003

(30) Foreign Application Priority Data

Feb. 15, 2002 (SE) .............................................. 0200447

(51) Int. Cl.⁷ ............................................. G01T 1/185
(52) U.S. Cl. ..................................... 250/385.1; 250/374
(58) Field of Search .............................. 250/385.1, 374

(56) References Cited

U.S. PATENT DOCUMENTS

| | | | | |
|---|---|---|---|---|
| 4,096,391 A | * | 6/1978 | Barnes ........................ | 378/146 |
| 4,217,498 A | * | 8/1980 | Racz et al. .................... | 378/19 |
| 4,426,721 A | | 1/1984 | Wang | |
| RE32,779 E | * | 11/1988 | Kruger ......................... | 378/19 |
| 4,873,708 A | * | 10/1989 | Cusano et al. ................. | 378/19 |
| 4,973,846 A | | 11/1990 | Lanza et al. | |
| 5,796,110 A | * | 8/1998 | An et al. ..................... | 250/385.1 |
| 6,118,125 A | * | 9/2000 | Carlson et al. ........... | 250/385.1 |
| 6,337,482 B1 | | 1/2002 | Francke .................... | 250/385.1 |
| 6,373,065 B1 | | 4/2002 | Francke et al. .............. | 250/374 |
| 6,385,282 B1 | | 5/2002 | Francke et al. ................ | 378/51 |
| 6,414,317 B1 | | 7/2002 | Francke et al. .......... | 250/385.1 |
| 2002/0003860 A1 | | 1/2002 | Francke et al. ............ | 378/98.8 |
| 2003/0205676 A1 | * | 11/2003 | Nelson et al. ......... | 250/370.09 |

FOREIGN PATENT DOCUMENTS

| | | |
|---|---|---|
| WO | WO 00/36820 A3 | 6/2000 |
| WO | WO 00/55645 | 9/2000 |
| WO | WO 00/62094 | 10/2000 |
| WO | WO 01/69284 A1 | 9/2001 |

* cited by examiner

*Primary Examiner*—Albert Gagliardi
(74) *Attorney, Agent, or Firm*—Harness, Dickey & Pierce, P.L.C.

(57) ABSTRACT

A radiation detector arrangement for imaging of an object comprises multiple line detector units, each being arranged for one-dimensional imaging of the respective ray bundle. The detector units are arranged parallel in a two-dimensional array. The detector units are sited in rows and stacks, the rows being parallel with the detector unit and the stacks being orthogonal thereto, where the one-dimensional detector units in each row are together capable of detecting the object in one dimension. A device is provided for moving the detector units relative the object parallel with the stacks at least a distance corresponding to the distance between two adjacent detector units in the stacks.

34 Claims, 7 Drawing Sheets

RADIATION DETECTOR ARRANGEMENT

FIELD OF THE INVENTION

The invention relates to scanning-based ionizing radiation detector arrangements for two-dimensional detection of an object.

BACKGROUND OF THE INVENTION AND RELATED ART

Gaseous-based ionizing radiation detectors, in general, are very attractive since they are cheap to manufacture, can employ gas multiplication to strongly amplify the signal amplitudes, and provide for detection with high spatial resolution.

A particular kind of gaseous-based ionizing radiation detector is the one, in which electrons released by interactions between photons and gas atoms can be extracted in a direction essentially perpendicular to the incident radiation. Hereby, a strongly improved spatial resolution is achievable.

Such a detector comprises typically planar cathode and anode arrangements, respectively, and an ionizable gas arranged in the space formed between the cathode and anode arrangements. The detector is arranged such that a planar radiation beam from a radiation source can enter the detector sideways between, and essentially parallel with, the cathode and anode arrangements for ionizing the ionizable gas. Further, a voltage is applied between the electrodes for drifting, and optionally multiplying, electrons created during ionization of the ionizable gas. A readout arrangement is arranged in connection to the anode for detecting the charge induced by the drifted electrons.

The detector obviously provides for instantaneous one-dimensional imaging, but to perform two-dimensional imaging the detector, and optionally the radiation source, have to be moved in a direction traverse to the one-dimensional detector array relative to an object being examined while several readouts are recorded. Such scanning-based two-dimensional detection is however time consuming and is impractical if large areas should be imaged. Further, if the object being examined is a human or an animal there is a risk that the human or animal moves during scanning, which could make the image useless or at least severely reduce the image quality obtained.

To reduce scanning time a stacked detector arrangement has been proposed in U.S. Pat. No. 6,118,125 by Francke at al., with which multi-line scans can be achieved. The arrangement includes an X-ray source, which together with a number of collimator windows produce a stack of planar fan-shaped X-ray beams for irradiation of the object to be imaged. The beams transmitted through the object enter the stacked detectors, optionally through a number of second collimator windows, which are aligned with the X-ray beams. The arrangement is moved as a unit to scan an object, which is to be examined.

SUMMARY OF THE INVENTION

In some applications such as e.g. medical applications the area to be imaged may be as large as 50 cm×50 cm, and the present inventors have noticed that a stacked detector arrangement as the one described in U.S. Pat. No. 6,118,125 for large area applications is very impractical to manufacture and use. Manufacturing tolerances are difficult to hold and to manufacture high-resolution detector units in volumes calls for a high level of efficiency, uniformity and quality.

A main object of the invention is therefore to provide a scanning-based ionizing radiation detector arrangement for two-dimensional detection of a large object with high spatial resolution.

In this respect there is a particular object to provide such a detector arrangement, which is suitable for volume production and still can produce large high-quality images, e.g. for medical examinations.

A further object of the invention is to provide such a detector arrangement, which comprises a plurality of line detector units in a dense matrix to shorten scanning time and distance.

A yet further object of the invention is to provide such a detector arrangement, which is reliable, accurate, inexpensive, and which has a long lifetime.

A still further object of the invention is to provide such a detector arrangement, which is capable of mitigating the problems caused from unusable dead channels (i.e. individual readout elements of the readout arrangement) by means of using more than one line detector unit to scan the same area of the object, also referred to as oversampling.

A yet further object of the invention is to provide such a detector arrangement, wherein movement blurredness can be minimized by means of recording short snapshots of each portion of the object by individual line detector units, where a possible movement of the object during a limited period of time, e.g. a heartbeat by a patient under investigation, only will affect a limited number of line images and not the complete two-dimensional image as is obtained by prior art two-dimensional detectors.

A still further object of the invention is to provide such a detector arrangement, wherein the effect of any movement blurredness can be further reduced by means of oversampling, i.e. recording a plurality of images at each location such that each portion of the two-dimensional image of the object is built up by contributions from several line images recorded at different times, where the object is most probably not moving during all of the several line image recordings.

A yet further object of the invention is to provide such a detector arrangement, wherein a plurality of line detector units are arranged in a matrix to provide for an overlap between channels (i.e. readout elements of the line detectors) located at the far edges to reduce the effect of possible edge phenomena, e.g. lower sensitivity at the far edges of the line detectors.

These objects, among others, are attained by detector arrangements as claimed in the appended claims.

The inventors have found that by arranging smaller ionizing radiation detector units, well suited to be volume produced with high precision, in a two-dimensional array, a scanning-based detector arrangement for highly resolved two-dimensional imaging of large objects, such as breasts in mammography examinations, is provided.

Further characteristics of the invention, and advantages thereof, will be evident from the detailed description of preferred embodiments of the present invention given hereinafter and the accompanying FIGS. 1–8, which are given by way of illustration only, and thus are not limitative of the present invention.

DESCRIPTION OF PREFERRED EMBODIMENTS

Figure 1:
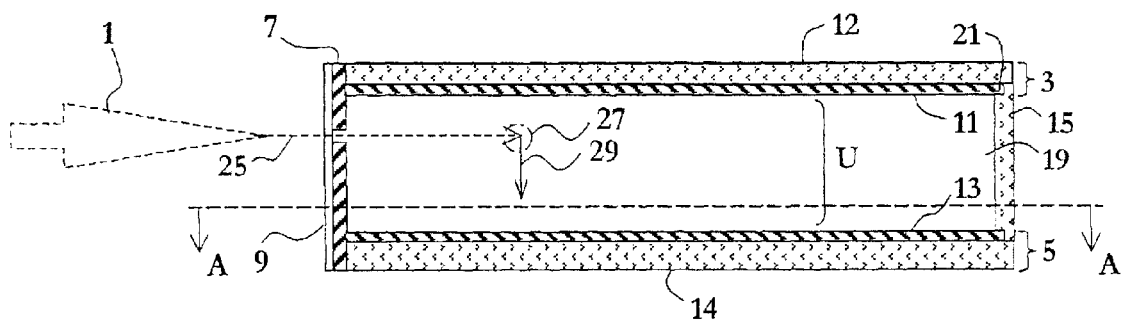
FIG. 1 illustrates schematically, in a cross-sectional side view, a detector unit for use in a scanning-based detector arrangement of the present invention.
Figure 2:
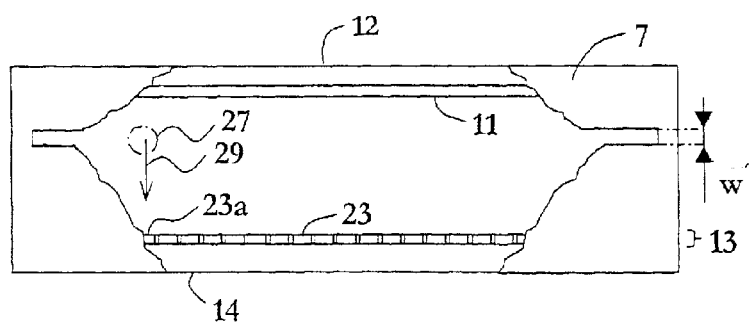
FIG. 2 illustrates schematically, in a front view with an entrance collimator partly removed, the detector unit of FIG. 1.
Figure 3:
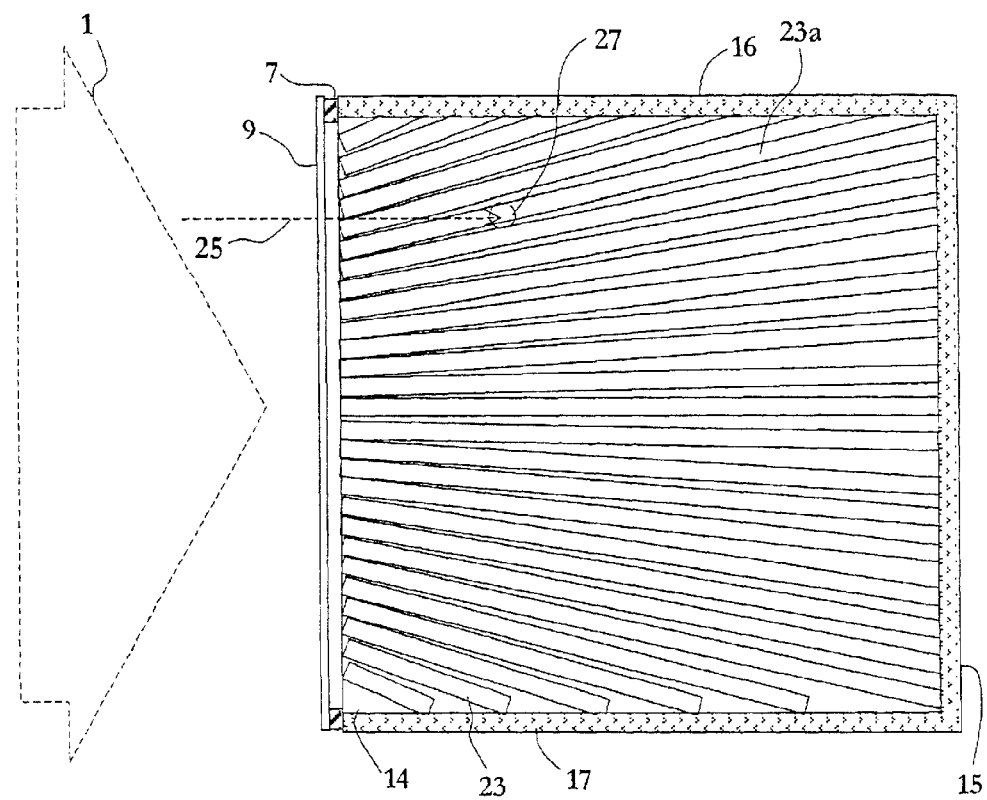
FIG. 3 illustrates schematically a cross-sectional view of the detector unit of FIG. 1 as taken along the line A—A.

With reference to FIGS. 1–3, which are a cross-sectional side view, a front view with collimator portions removed, and a cross-sectional top view, respectively, of a detector unit for use in a scanning-based detector arrangement of the present invention, this detector unit will briefly be overviewed.

The detector unit is oriented such that a planar X-ray beam 1 can enter sideways between a cathode arrangement 3 and an anode arrangement 5. A slit-shaped collimator 7 and a radiation transparent window 9 are provided at the front of the detector unit to form an entrance for the X-ray beam 1 to the detector unit. The slit-shaped collimator 7 may be a thin metallic foil of e.g. tungsten glued to the entrance side of the detector unit, in which a thin slit is etched; and the radiation transparent window 9 may be a thin plastic or carbon fiber foil.

Each of the electrode arrangements 3, 5 includes an electrically conducting electrode layer 11, 13 supported by a respective dielectric substrate 12, 14, wherein the arrangements are oriented such that the cathode 11 and anode 13 layers are facing each other. Preferably, the electrode arrangements 3 and 5 are planar, rectangular and parallel to each other. The anode and cathode arrangements 3, 5 may be a metallized glass plate. The cathode layer 11 may alternatively be of doped silicon and glued to a dielectric substrate made of glass.

Preferably, the electrode arrangements 3 and 5 and the window 9 define together with sidewalls 15, 16, 17 a gas-tight confinement 19 capable of being filled with a gas or gas mixture. Alternatively, the electrode arrangements 3 and 5 are arranged within an external gas-tight casing (not illustrated). The ionizable gas or gas mixture may e.g. comprise krypton and carbon dioxide or xenon and carbon dioxide. The gas may be under pressure, preferably in a range 1–20 atm.

The sidewalls 15, 16, 17 may have recesses as may be seen at 21 in FIG. 1, such that the sidewalls can operate as spacers or supports along at least portions of the peripheries of the electrode arrangements 3 and 5 to keep the cathode 11 and the anode 13 apart at a well-defined distance. Alternatively, separate spacers are provided between the cathode 3 and anode 5 arrangements.

A high voltage DC supply unit (not illustrated in FIGS. 1–3) is provided for the purpose of holding the cathode 11 and the anode 13 at suitable electric potentials to create an electric field within the inter-electrode confinement 19 for drift, and optionally amplification, of electrons and ions therein. Conveniently, the cathode 11 is held, during use, at a negative voltage $-V_1$, whereas the anode 13 is grounded.

Still further, the detector unit comprises a readout arrangement for detection of electrons drifted towards the anode 13 and/or ions drifted towards the cathode 11. The readout arrangement is comprised of the anode arrangement 5 itself as illustrated in FIGS. 1–3. Alternatively, a separate readout arrangement may be arranged adjacent anode 13 or adjacent cathode 11, or elsewhere.

To provide for one-dimensional imaging capabilities, the anode/readout layer 13 is comprised of an array of conductive or semiconducting elements or strips 23 arranged side by side and electrically insulated from each other on the dielectric substrate 14. To compensate for parallax errors in detected images, and to thereby provide for an increased spatial resolution, the anode/readout strips extend essentially in directions parallel to the direction of incident photons of the X-ray beam at each location. Thus, given a divergent beam from a point source the anode/readout strips 23 are arranged in a fan-like configuration.

In an alternative configuration of anodes/read-out arrangement (not illustrated), the strips are further divided into segments in the direction of the incident X-rays, the segments being electrically insulated from each other and individually connected to the processing electronics. Such read-out arrangement can be used for energy-resolved detection of radiation. In this respect specific reference is made to our co-pending Swedish patent application Swedish patent application No. 0001167-6 entitled Spectrally resolved detection of ionizing radiation and filed on Mar. 31, 2000, which application hereby is incorporated by reference.

Each of the anode/readout strips is preferably connected to a readout and signal-processing device (not illustrated in FIGS. 1–3), whereupon the signals from each strip can be processed separately. As the strips also constitute the anode suitable couplings for separation are needed.

In the case the one-dimensional readout is a separate device, the anode layer 13 can obviously be formed as a unitary electrode without strips.

It shall be appreciated that the distance between the electrode layers 11 and 13 is strongly exaggerated in FIGS. 1 and 2 for illustrative purposes. As an example geometry the detector unit may be 40 mm wide, 2 mm thick and 35 mm deep, whereas the inter-electrode distance may be between 0.05 and 2 mm. The width w of the collimator slit, which governs the thickness of the sheet of radiation that enters the detector unit, may be as small as 10 μm or as wide as 2 mm or more. Each readout strip 23 may be 10 μm–2 mm wide, which implies that several hundred or thousand strips may be arranged side by side in a single detector unit, i.e. much more than illustrated.

In operation, X-rays enter the detector unit through the collimator slit, parallel and close to the cathode arrangement 3. The X-rays will interact with the gas in the detector unit according to an exponential probability distribution where the majority of the X-rays convert early in the gas volume. The average interaction length may typically be 10–100 mm.

At an interaction, an X-ray photon 25 transmits its energy to an electron in a gas atom, which is released from the atom through processes known as photo effect, Compton scattering and/or Auger effect. This electron travels through the gas and collides with new gas atoms, thereby liberating more electrons until it eventually has lost all its energy and stops. In this process a cloud 27 typically of about thousand electrons is created.

By applying an electric field U between the cathode 11 and the anode 13, these electrons are attracted towards the anode in a direction 29 (vertical in FIGS. 1–2), which is essentially perpendicular to the incoming X-ray photon trajectory. If the electric field applied is strong enough, the electrons gain enough energy to knock out further electrons from the gas, which in turn are accelerated, and knock out yet further electrons in an avalanche process. This process is known as gaseous avalanche amplification. As the now large number of electrons approaches the anode, they induce electric signals in the strip 23a nearest to the cloud 27.

The electronic signal is detected by the readout electronics connected to the strip. In the electronics, the signal is amplified and compared with a threshold voltage. If the signal exceeds the threshold voltage, a counter specific for this strip is activated and adds one to a previous value stored. In this way, the number of X-rays impinging above each anode strip is counted. The method is called photon counting.

Alternatively, the signals from many X-rays may be integrated into a single number related to the total energy deposited by all that X-rays together.

Figure 4:
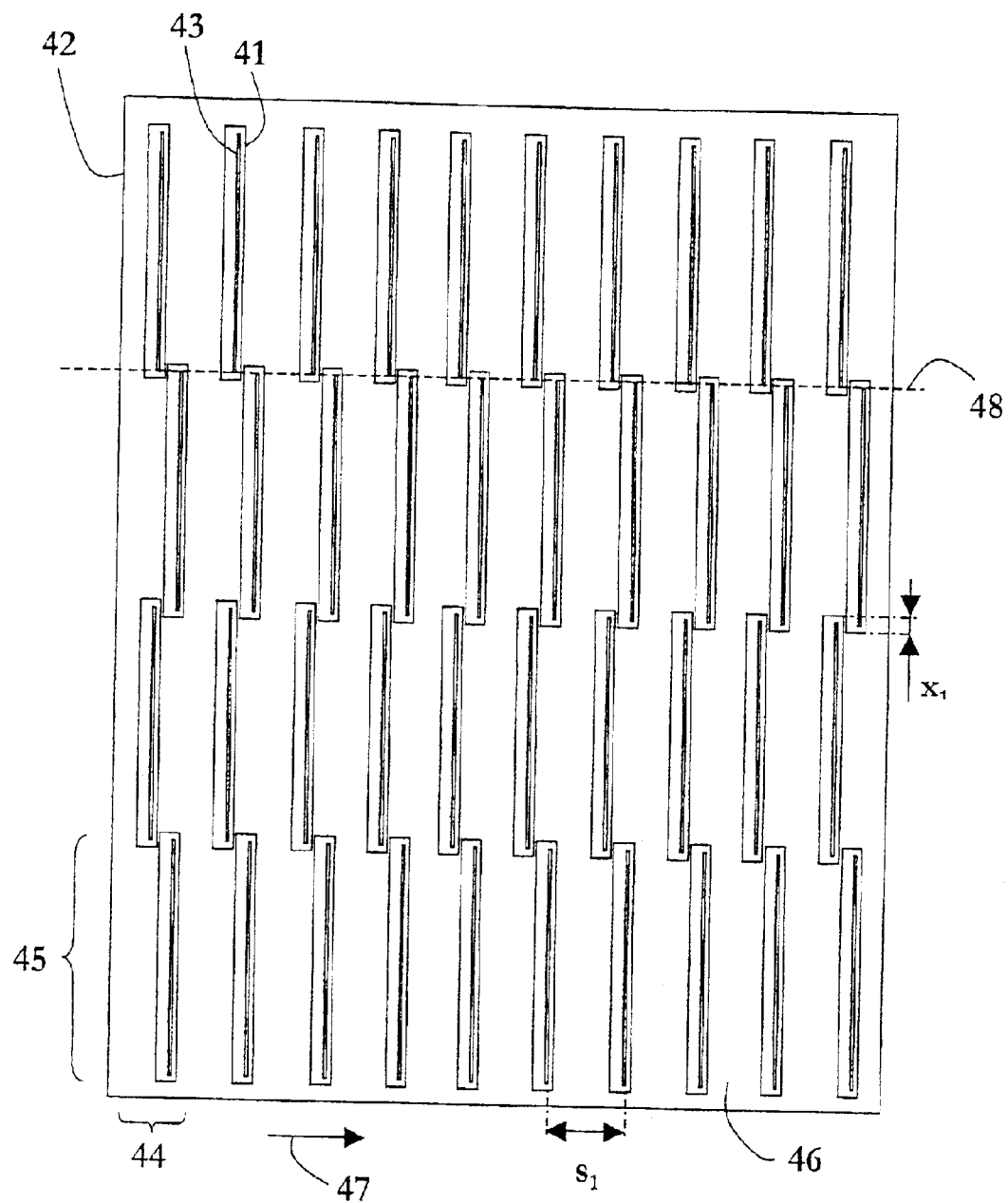
FIG. 4 illustrates schematically, in a front view, a scanning-based detector arrangement according to a first embodiment of the present invention, the arrangement including a plurality of the detector unit of FIGS. 1–3.

With reference now to FIG. 4, which illustrates schematically, in a front view, an X-ray scanning-based detector arrangement including a plurality of the detector unit of FIGS. 1–3 a first embodiment of the present invention will be described.

The arrangement includes a plurality of line detector units 41 arranged on a common support structure 42 in a two-dimensional array with their respective entrance slits 43 facing the front of the arrangement. For illustrative purposes FIG. 4 only includes a matrix of 4×10 detector units, i.e. each row 44 includes four detector units and each stack 45 includes ten detector units, even though it shall be appreciated that the arrangement may include many more units. For instance if the detector units are spaced apart by $S_1=5$ mm (from entrance slit 43 to entrance slit) and an area of typically 20×20 to 50×50 $cm^2$ shall be covered each stack may include 40–100 detector units. The width of each line detector unit may for instance be 40–60 mm, and thus typically 5–12 detector units are arranged in each row.

Further the detector arrangement of FIG. 4 may include side and front covers (not explicitly illustrated).

In operation, the object to be examined is placed in front of the detector. The detector arrangement is scanned across the object in a pivoting or translative movement essentially in the direction of arrow 47 while the detector units are repeatedly read out, hence creating a two-dimensional image.

It shall be noted that an inventive feature of the FIG. 4 embodiment is the staggering of the detector units 41 in each row 44. Since the detector unit of FIGS. 1–3 is not capable of detecting at its extreme side portions due to the presence of the sidewalls and spacers as can be seen in FIGS. 2 and 3, the units are staggered to cover the complete distance of 20–50 cm, avoiding any "dead" zones. Where the entrance slit of one detector unit ends, the entrance slit of a further detector unit begins in each row 44. This feature can be seen distinctly along dashed line 48 in FIG. 4 and calls for an overlap $x_1$ between the detector units, where $x_1$ may typically be at least 0.05–10 mm. The overlap may be even larger, see discussion below with reference to FIG. 6.

Figure 5:
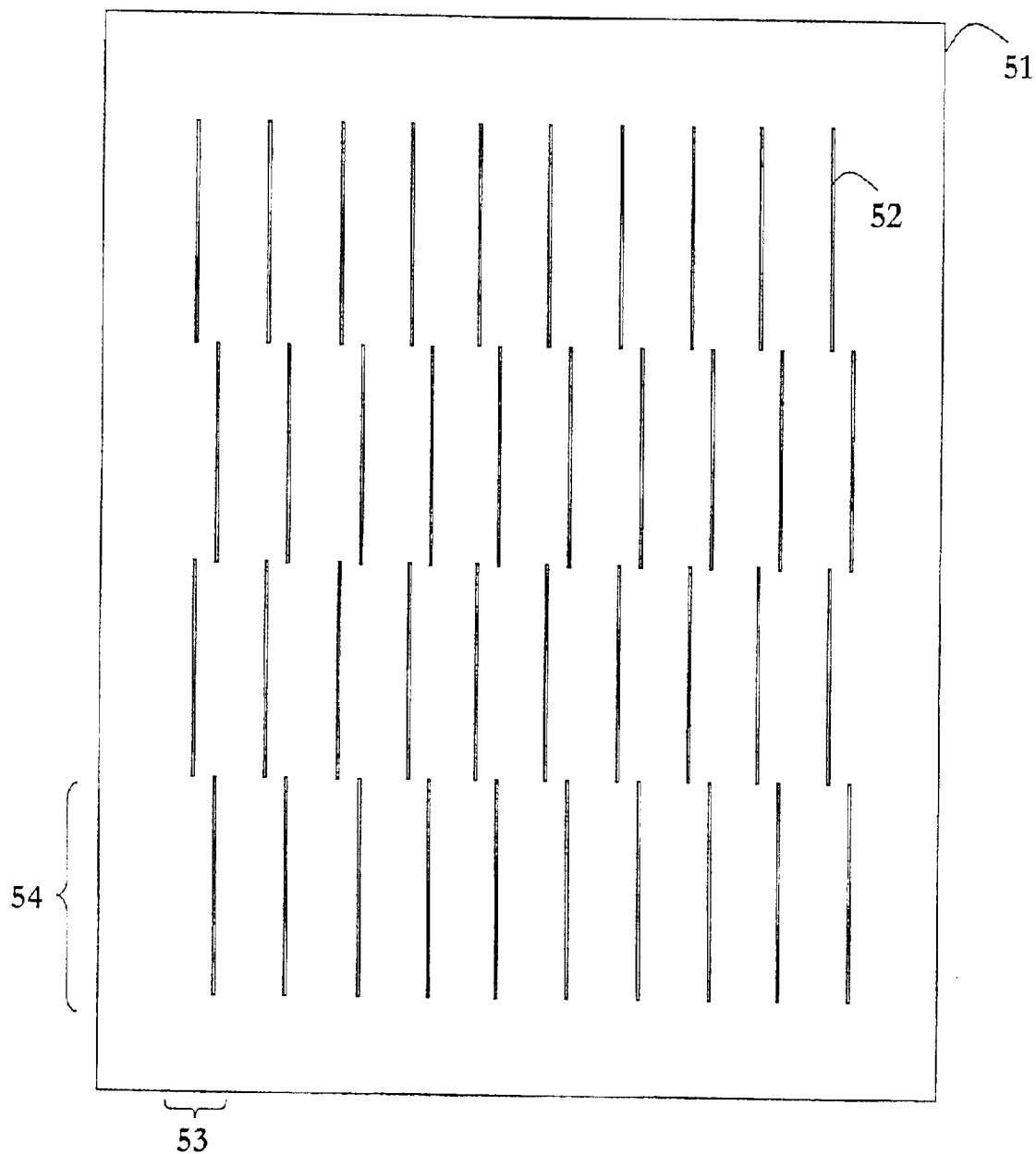
FIG. 5 is a schematic plan view of an upstream collimator, which may be included in e.g. the scanning-based detector arrangement embodiment of FIG. 4 to reduce the radiation dose to an object under examination.

In order to reduce the radiation dose to the patient a collimator as the one illustrated in FIG. 5 is typically arranged between the radiation source and the patient. The collimator 51 is of a radiation-absorbing material, e.g. tungsten, and includes a plurality of radiation transparent slits 52 arranged in rows 53 and stacks 54. The radiation transparent slits 52 are aligned with the entrance slits of the detector units of the FIG. 4 arrangement, such that each planar radiation beam as produced by the collimator 51 is transmitted through a respective portion of the patient and is entered into a respective one of the detector units in the FIG. 4 arrangement. The collimator 51 is then moved together with the detector arrangement during scanning to keep the alignment.

It shall be appreciated that the line detector units are not necessarily arranged parallel with each other on a plane substrate, but are arranged to point towards the radiation source used such that radiation from the radiation source can enter the respective detector unit.

For the same purpose the collimator 51 has slits that are less spaced apart than the detector units and narrower that the detector unit entrance slits. The alignment between the radiation source (point source, line source or 2D source), the collimator 51 and the detector arrangement provides for multiple planar radiation beams from the radiation source passing through the collimator 51 and into the individual detector units 41 of the detector arrangement.

It shall be further appreciated that instead of arranging multiple individual detector units 41 with separate gas-tight confinements in the detector arrangement, a detector arrangement having a common gas-tight enclosing for all individual detector units may be provided (not illustrated). Such a detector box would include the support 42, sidewalls, and a front cover including a common collimator provided with the entrance slits 43, e.g. a collimator similar to the collimator as shown in FIG. 5, and a common radiation transparent entrance window in front thereof. The rectangle of the individual detector units 41 in FIG. 4 would thus represent the electrodes of each detector unit separated by two spacers, and the sidewalls 15, 16 and 17, the slit-shaped collimator 7 and the radiation transparent window 9 of each detector unit may be dispensed with.

Figure 6:
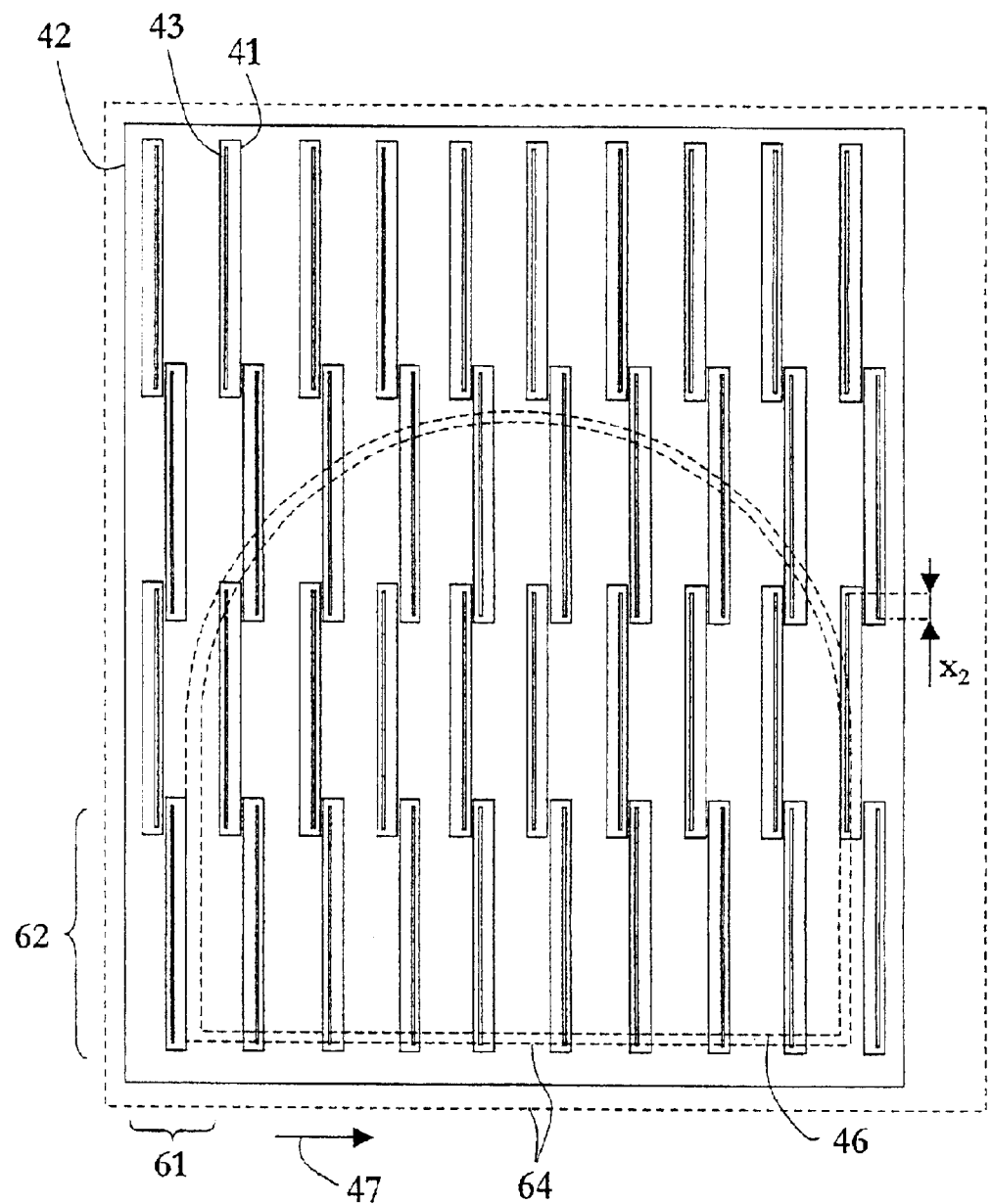
FIG. 6 illustrates schematically, in a front view, a scanning-based detector arrangement according to a second embodiment of the present invention, the arrangement including a plurality of the detector unit of FIGS. 1–3.

With reference now to FIG. 6, which illustrates schematically, in a front view, an X-ray scanning-based detector arrangement a second embodiment of the present invention will be overviewed.

Still another feature of the FIG. 6 embodiment relates to the collimation or screening of incident radiation. By the provision of a further collimator or shielding device with a controllable variable aperture, large amounts of radiation, which are not needed for the examination, may be stopped before reaching the examination object. The collimator is arranged upstream of the examination object, preferably immediately before or after the collimator 51 if being used, and is schematically indicated by dashed lines 64 in FIG. 6.

The design of the detector arrangement of the present invention is excellent for a fast determination of the outer shape of the examination object at the beginning of the scan or before the scan has started, e.g. during a fast exposure control measurement. The approximate shape of the object is determined, e.g. by a decision algorithm based on thresholding. Thereafter the variable aperture of the collimator or shielding device is controlled to shield radiation not passing through the object, and to let through only radiation passing through the object.

In FIG. 6 is illustrated a collimator with semicircular aperture. However, collimators of other shapes, e.g. circular or rectangular, may be equally suitable for the purpose.

The object of the collimator 64 is to shield radiation, which is not needed and which can be scattered and interfere with the measurements in an unwanted way, e.g. reduce the signal-to-noise ratio, or be redirected towards the object under investigation with an increased radiation dose to the object as a result. Thus, an increased detection quality and a decreased radiation dose are achieved by the use of collimator 64.

In FIG. 6 the detector units are arranged with an overlap between the detector units of adjacent rows of e.g. 5–10 mm, i.e. an overlap which is larger than the overlap of the FIG. 4 arrangement, to assure an overlap $x_2$ also between the entrance slits of the detector units of adjacent rows, i.e. between the active detection areas, such that double measurement values are obtained from "stripes" across the examination object. This is valuable if the individual detector units suffer from edge effects, e.g. lower sensitivity at the far edges of the line detectors, or similar such that the measurement values of the outer detection elements are unreliable. Further, any damages on individual ones of these detection elements or the readouts thereof would not cause lacking or "dead" pixel values in the images obtained.

Figure 7:
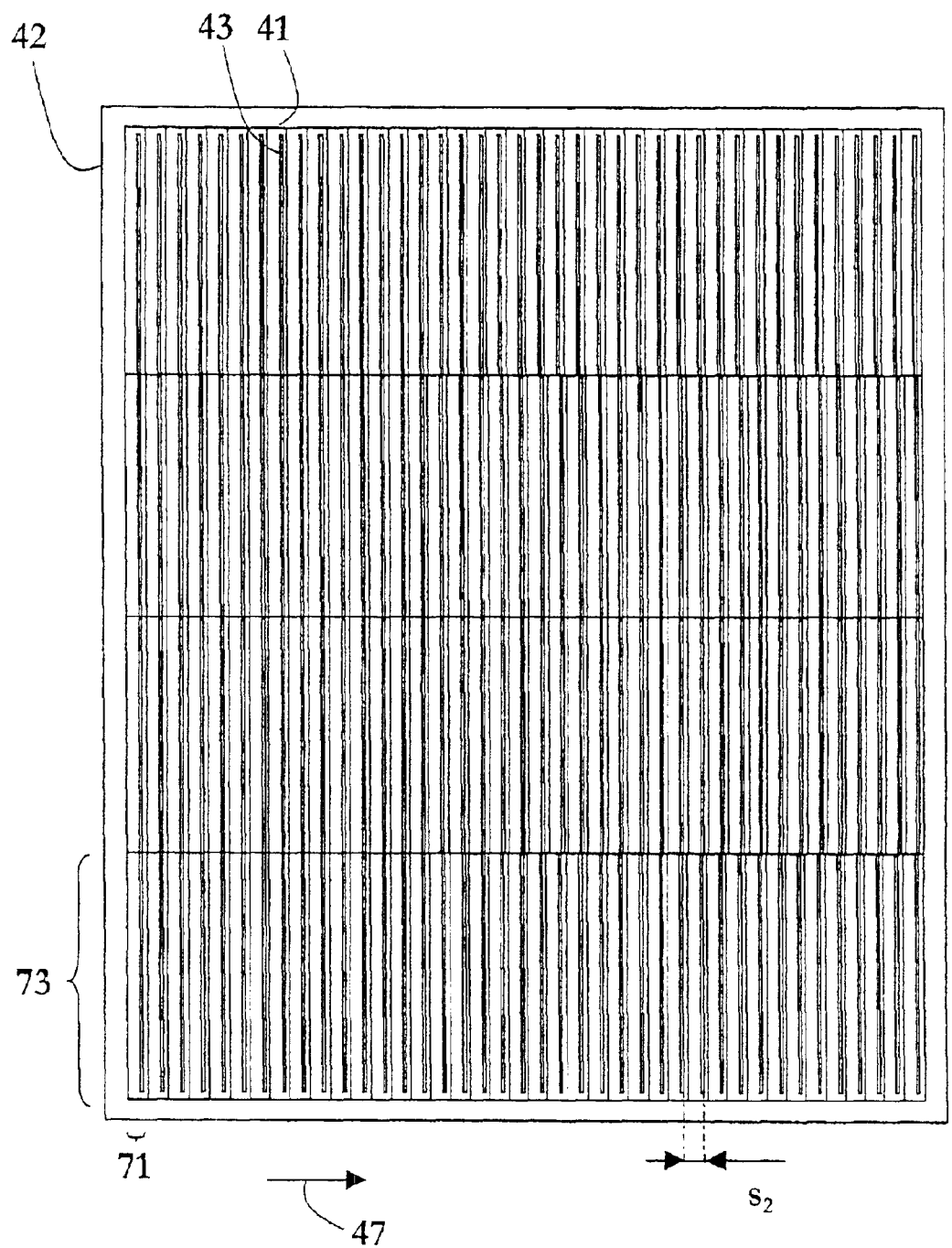
FIG. 7 illustrates schematically, in a front view, a scanning-based detector arrangement according to a third embodiment of the present invention, the arrangement including a plurality of the detector unit of FIGS. 1–3.

With reference next to FIG. 7, which illustrates schematically, in a front view, a scanning-based detector arrangement, a third embodiment of the present invention will be depicted.

Here, the line detector units 41 are arranged in rows 71 along straight lines and in stacks 73 closely together. In order not to obtain black stripes in the images or very much incomplete images, the detector units have to be capable of detect also at their extreme side portions. This is hardly performed using the detector unit as described with reference to FIGS. 1–3. However, by using a detector arrangement having a common gas-tight enclosing for all individual detector units as described with reference to the FIG. 4 embodiment and slightly modified detector units, the FIG. 7 embodiment is realizable.

The sidewalls 16 and 17 of the detector unit (see FIG. 3) can be dispensed with since the units have a common gas-tight enclosing. Further, the spacers holding the electrodes at a well-controlled distance from each other can be arranged at the back and front sides of the detector only and optionally in the middle part of the detector traverse to the readout elements 23 (the front and middle part spacers have to be transparent to the incident radiation). These provisions free space at the extreme side portions and the readout elements may be distributed to the extreme sides of the detector unit.

As the detector units in each row 71 are arranged along a straight line, side by side, they can be arranged close together in each stack 73. Provided that the units in the stack are placed up against each other and a detector thickness of 2 mm the scanning distance $s_2$ (and time) can be reduced by a factor of 2.5 compared to the FIG. 4 embodiment.

It shall be appreciated that the embodiments of the inventive scanning-based detector arrangement described above with reference to FIGS. 4, 6 and 7 may, instead of including a plurality of the detector unit as illustrated in FIGS. 1–3, be provided with a plurality of line detector units of virtually any kind, e.g. PIN-diodes of semiconductors such as silicon where the X-rays interact with the semiconductor within the PIN diode and releases charges, photosensitive detectors coated with scintillating materials, selenium or other semiconductor covered electronic devices to detect the deposited charge such as thin-film transistor (TFT) circuits, CCD's, CMOS circuits etc.

However, a preferred line detector unit is the gaseous-based ionization detector, optionally provided with an electron avalanche amplifier, and particularly such gaseous-based ionization detector wherein the freed electrons are drifted in a direction essentially perpendicular to the direction of the incident ionization. For further details regarding different kind of gaseous-based detector units for use in the scanning-based detector arrangement of the present invention, reference is made to the following U.S. patent applications by Tom Francke et al. and assigned to XCounter AB, which applications hereby are incorporated by reference: Ser. No. 08/969554 (issued as U.S. Pat. No. 6,118, 125); Ser. Nos. 09/443,292; 09/443,320; 09/443,321; 09/444,569; 09/550288; 09/551603; 09/552692; 09/698174; 09/708521; 09/716228; and 09/760748.

Figure 8:
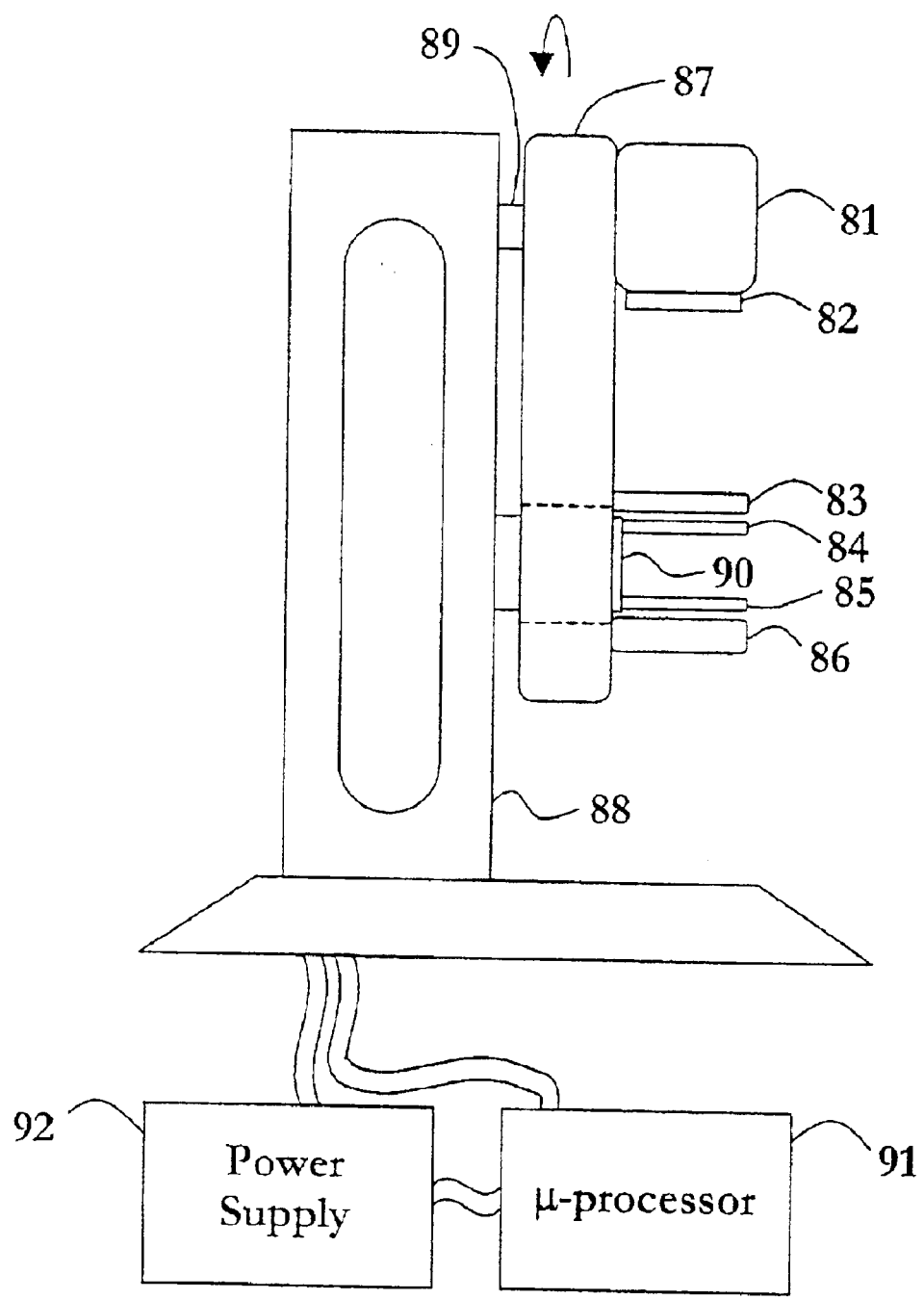
FIG. 8 illustrates schematically, in a side view, a device for mammography examinations according to the present invention, the device including the scanning-based detector arrangement as illustrated in any of FIGS. 4, 6 or 7 and the upstream collimator as illustrated in FIG. 5.

With reference finally to FIG. 8, which illustrates schematically, in a side view, a device for mammography examinations a further embodiment of the present invention will be described.

From top to bottom the device comprises an X-ray source 81, filters 82, an upstream collimator 83, an upper 84 and a lower compression plate 85 and a detector arrangement 86.

The X-ray source 81 is a conventional X-ray tube. Just beneath the X-ray tube are placed thin metallic foils acting as the filters 82 to absorb the lowest (and sometimes also the highest) energy photons, which do not contribute significantly to the image quality but do increase the radiation dose to the patient. This is described in regulatory requirements.

The upstream collimator 83 is a thin foil of e.g. tungsten with multiple narrow slits etched away, e.g. the collimator of FIG. 5. The slits are aligned such that X-rays passing through each slit will reach a corresponding slit in the detector arrangement. The purpose of this collimator is to reduce the radiation dose to the patient. Only X-ray photons that are capable of entering the detector arrangement entrance slits are allowed to pass through the patient's breast.

The detector arrangement may be any of the scanning-based detector arrangements as described above with reference to FIGS. 4, 6 or 7.

The X-ray tube 81, the upstream collimator 83 and the detector arrangement 86 are attached to a common E-arm 87, which in turn is rotatably attached to a vertical stand 88 by means of a spindle 89 approximately at the height of the X-ray tube 81. In this manner, the X-ray tube 81, the upstream collimator 83 and the detector arrangement 86 can be moved in a common pivoting movement relative to the breast to scan the breast and produce a two-dimensional image thereof. Assuming a distance of 5 mm between the detector units in the detector arrangement and a distance of 65 cm between the spindle 89 and the detector arrangement a scan corresponds typically to a rotation of about 0.5°, which typically may be performed in the order of a second depending on the poser of the X-ray source and the desired number of detected X-rays per image element.

If an upstream shielding device with a controllable variable aperture for shielding of radiation not passing through the object as described above with reference to FIG. 6 is to be used, it is also attached to the E-arm 87 to keep alignment during scanning.

The two compression plates 84 and 85 are firmly attached to the vertical stand 88 by means of a support 90 in a recess or similar in the E-arm 87. During the examination the breast is compressed between the two compression plates 84 and 85, which for the purpose thereof are movable in the vertical direction and lockable.

Further, the device comprises a microprocessor or computer 92 provided with suitable software for controlling the device and readout and post-processing of the charges induced in the readout strips of the individual line detector units and a power supply 91 for applying the electrical fields in the detector units, for powering the microprocessor or computer 92 and for driving a step motor or similar housed in the vertical stand 88 for driving the spindle 89 and thus the E-arm 87.

As an alternative to rotating the radiation source/detector arrangement assembly including the collimator, and possibly the shielding device, it may be moved linearly during the scanning, e.g. by moving the E-arm linearly by means of a linear motor (not illustrated).

Still alternatively, each component or each of some of the components of the device for mammography examinations, which is to be moved during scanning, may be connected to a respective individual translation unit, where each individual translation unit is capable of moving the respective component, to which it is attached, individually (neither illustrated). Preferably, the translation units are controlled by a common control circuit, which may be the microprocessor or computer 92.

In operation, X-rays are emitted from the X-ray tube 81 and pass through the filter foils 82. The upstream collimator 83 absorbs most of the X-rays. Only those passing through the slits in this collimator 83 traverse the breast between the two compression plates 84 and 85. In the breast, the X-ray photons can be transmitted, absorbed or scattered. The X-rays that are transmitted leave the breast and enter into the detector arrangement entrance slits and are detected.

Alignment of the device is performed by moving the X-ray source 81 in the horizontal plane until a maximum X-ray flux is detected in the line detector units while the upstream collimator 83 is removed. This is a process that can be performed to calibrate external alignment sensors. Such external alignment sensors may be one- or two-dimensional optical position sensitive sensors placed at the detector arrangement. They are illuminated by laser diodes attached to the X-ray tube. When the correct position of the X-ray tube is found, the position of the light spot on each optical sensor is stored and after this used to continuously maintain the X-ray source in the right position.

When the X-ray source is positioned correctly with respect to the line detectors, the upstream collimator 83 is inserted into place and aligned. The upstream collimator 83 is moved in the horizontal plane until a maximum X-ray flux is detected by the line detector units. The upstream collimator 83 can be kept aligned by use of external alignment sensors as described above.

The procedure for scanning a patient's breast and to thereby produce a two-dimensional X-ray image is as follows. The breast is compressed between the compression plates 84 and 85. The X-ray source 81 is activated and the E-arm 87, holding the X-ray source 81, the upstream collimator 83 and the detector arrangement 86, is moved in a pivoting movement such that the detector arrangement scans across the breast in a direction, which is essentially parallel with the compression plates 84 and 85 and parallel with the chest wall.

Each readout strip in each line detector is continuously counting the number of X-rays that produces a signal in that individual readout strip. At regular movement intervals, typically every 10–500 micrometer, the content of each counter is read out and stored in a memory of the microprocessor 92 and all counters are reset to zero. In this way, each line detector gives a number of line images of the breast. When the X-ray source and the scanning are stopped, all these image segments are grouped together by the microprocessor 92 to form a two-dimensional image.

It shall be appreciated that the content of each counter can be read out and stored every scanned distance, which is equal to the width w of the detector unit entrance slits and thus the thickness of the planar radiation beams entering the detector units.

Alternatively, the content of each counter can be read out and stored more often to provide an image having more pixels and which thus have an increased spatial resolution.

It shall be further appreciated that the scanning can be performed a total distance, which is equal to the distance $s_1$, $s_2$ between each two adjacent detector units in each stack of the detector arrangement.

Alternatively, the scanning can be performed a total distance, which is longer than the distance $s_1$, $s_2$ between each two adjacent detector units in each stack of the detector arrangement to obtain an overlap in the scan to be capable of avoiding any measurement problems at the beginning and/or at the final of the scan.

Still alternatively, the scanning can be performed a total distance, which is at least twice the distance $s_1$, $s_2$ between each two adjacent detector units in each stack of the detector arrangement to obtain a double scan. By means of such oversampling by more than one line detector unit is used to scan the same area of the object and any measurement problems due to individual readout strips being damaged and out of operation can be avoided.

The effect of this movement blurredness can be further reduced by means of oversampling, i.e. recording several (at least two) images at each location such that each portion of the two-dimensional image of the object is built up by contributions from several line images recorded at different times, where the object is most probably not moving during all of the several line image recordings.

It will be obvious that the invention may be varied in a plurality of ways. Such variations are not to be regarded as a departure from the scope of the invention.

What is claimed is:

1. A scanning-based radiation detector arrangement for two-dimensional imaging of an object comprising a plurality of one-dimensional detector units, each exposed to a planar ray bundle of ionizing radiation, as transmitted through or scattered off said object, and being arranged for one-dimensional imaging of the respective planar ray bundle, said plurality of one-dimensional detector units being arranged in a two-dimensional array essentially parallel with each other and facing the respective planar ray bundles, wherein the one-dimensional detector units are sited in rows and stacks, the rows being parallel with the one-dimensional detector units and the stacks being essentially orthogonal thereto, where the one-dimensional detector units in each row together detect the object completely in one dimension, the one-dimensional detector units of each row are staggered with an overlap between adjacent one=dimensional detector units in the direction of the row, the one-dimensional detector units of each stack together detect essentially the outer shape of the object in a second dimension, which is perpendicular to said one dimension, and said two-dimensional array of essentially parallel one-dimensional detector units is arranged in a plane essentially orthogonal to a radiation direction of said plurality of planar ray bundles or ionizing radiation; and said scanning-based detector arrangement including a device for moving said two-dimensional array of one-dimensional detector units relative said object in a direction substantially parallel with the detector unit stacks at least a distance corresponding to the distance between two adjacent one-dimensional detector units in the detector unit stacks while the plurality of one-dimensional detector units are arranged to repeatedly detect, hence creating a two-dimensional image of the object.

2. The arrangement of claim 1 wherein each of said plurality of one-dimensional detector units comprises an entrance slit, through which the planar ray bundle of ionizing radiation is entered; and the rows of the one-dimensional detector units are parallel with the entrance slits of the one-dimensional detector units and the stacks are essentially orthogonal thereto.

3. The arrangement of claim 2 wherein the width of the entrance slit of each of the plurality of one-dimensional detector units is less than 500 μm.

4. The arrangement of claim 3 wherein the width of the entrance slit of each of the plurality of one-dimensional detector units is less than 100 μm.

5. The arrangement of claim 4 wherein the width of the entrance slit of each of the plurality of one-dimensional detector units is about 50 μm or less.

6. The arrangement of claim 1 wherein said plurality of one-dimensional detector units are arranged in a two-dimensional array on a common support structure.

7. The arrangement of claim 1 wherein said plurality of one-dimensional detector units are oriented such that the planar ray bundles irradiate the respective detector units at normal incidence.

8. The arrangement of claim 1 wherein each of said plurality of one-dimensional detector units is a gaseous-based ionizing radiation detector, wherein electrons released by interactions between radiation photons and the gases are extracted in a direction essentially perpendicular to the respective ray bundles entered into that one-dimensional detector unit.

9. The arrangement of claim 8 wherein each of said plurality of one-dimensional detector units comprises an essentially planar cathode and anode, respectively, between which an ionizable gas is arranged, and a readout arrangement including a one-dimensional array of individual readout elements arranged essentially parallel with the entrance slit of that detector unit, the cathode and anode being oriented such that the ray bundle enters the detector unit sideways between, and essentially parallel with, the cathode and anode for ionizing the ionizable gas.

10. The arrangement of claim 9 wherein each of said plurality of one-dimensional detector units comprises an electron avalanche amplifier.

11. The arrangement of claim 9 wherein each of said plurality of one-dimensional detector units comprises an entrance window and sidewalls, which together with the cathode and the anode define a gas-tight confinement filled with a gas or gas mixture suitable for ionization.

12. The arrangement of claim 9 comprising a common gas-tight confinement filled with a gas or gas mixture suitable for ionization, said common gas-tight confinement enclosing each of said plurality of one-dimensional detector units.

13. The arrangement of claim 12 wherein the one-dimensional array of individual readout elements and the entrance slit of each of said one-dimensional detector units extend across the complete width of that one-dimensional detector unit.

14. The arrangement of claim 9 wherein the width of each of the readout elements of each of the plurality of one-dimensional detector units is less than 500 μm.

15. The arrangement of claim 14 wherein the width of each of the readout elements of each of the plurality of one-dimensional detector units is less than 100 μm.

16. The arrangement of claim 15 wherein the width of each of the readout elements of each of the plurality of one-dimensional detector units is about 50 μm or less.

17. The arrangement of claim 9 wherein the number of readout elements of each of the plurality of one-dimensional detector units is at least 10.

18. The arrangement of claim 17 wherein the number of readout elements of each of the plurality of one-dimensional detector units is at least 100.

19. The arrangement of claim 1 wherein the number of one-dimensional detector units in each row is at least two.

20. The arrangement of claim 19 wherein the number of one-dimensional detector units in each row is between 4 and 10.

21. The arrangement of claim 1 wherein the number of one-dimensional detector units in each stack is at least 2.

22. The arrangement of claim 21 wherein the number of one-dimensional detector units in each stack is at least 10.

23. The arrangement of claim 22 wherein the number of one-dimensional detector units in each stack is between 10 and 200.

24. The arrangement of claim 1 wherein the one-dimensional detector units in each stack are spaced apart by less than 50 mm.

25. The arrangement of claim 24 wherein the one-dimensional detector units in each stack are spaced apart by less than 10 mm.

26. The arrangement of claim 25 wherein the one-dimensional detector units in each stack pre spaced apart by between 1 and 10 mm.

27. The arrangement of claim 1 wherein said device for moving said two-dimensional array of one-dimensional detector units relative said object in a direction substantially parallel with the detector unit stacks is adapted to move at least a distance corresponding to about twice the distance between two adjacent one-dimensional detector units in the detector unit stacks to be capable to create a complete two-dimensional image even if individual readout elements of the plurality of one-dimensional detector units are damaged or out of operation.

28. The arrangement of claim 1 comprising an upstream collimator of a radiation-absorbing material, which includes a plurality of radiation transparent slits arranged in rows and stacks, the number of the radiation transparent slits corresponding to the number of one-dimensional detector units, where the radiation transparent slits are aligned with the one-dimensional detector units, such that planar ray bundles as transmitted through the radiation transparent slits of the upstream collimator irradiate the respective one-dimensional detector units, and wherein said device for moving is adapted to move said two-dimensional array of one-dimensional detector units relative said object, while the alignment of the radiation transparent slits and the one-dimensional detector units is kept during the movement.

29. The arrangement of claim 28 comprising an X-ray source for producing the planar ray bundles, wherein said X-ray source, said upstream collimator and said detector arrangement are firmly mounted to a common rigid arm.

30. The arrangement of claim 28 comprising a space between the upstream collimator and the two-dimensional array of one-dimensional detector units for housing an object to be examined, and through which the planar ray bundles are transmitted before irradiating the respective one-dimensional detector units.

31. The arrangement of claim 30 adapted for use in mammography examinations and comprising an upper and lower compression plate, between which a breast of a patient, being the object to be imaged, is compressed, and wherein the patient is arranged to be oriented with respect to said device for moving, such that movement is parallel with, or perpendicular to, the chest wall of the patient.

32. The arrangement of claim 30 comprising a shielding device with a controllable variable aperture arranged upstream of said space for housing an object to be examined, where the variable aperture of the shielding device is controlled to shield radiation not passing through the object as determined from a fast measurement of the outer shape of the object.

33. The arrangement of claim 1 wherein said device for moving is adapted to move said object, while said two-dimensional array of one-dimensional detector units is kept still.

34. The arrangement of claim 1, wherein said device for moving is adapted to move said two-dimensional array of one-dimensional detector units relative to said object in said direction substantially parallel with the detector unit stacks a distance corresponding exactly to the distance between two adjacent one-dimensional detector units in the detector unit stacks while the plurality of one-dimensional detector units repeatedly detect to thereby create a two-dimensional image of the complete object.

* * * * *